(12) United States Patent
Takaki et al.

(10) Patent No.: US 12,325,973 B2
(45) Date of Patent: Jun. 10, 2025

(54) WORK VEHICLE

(71) Applicant: Kubota Corporation, Osaka (JP)

(72) Inventors: Satoshi Takaki, Sakai (JP); Kosuke Hattori, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 365 days.

(21) Appl. No.: 17/993,991

(22) Filed: Nov. 25, 2022

(65) Prior Publication Data

US 2023/0235531 A1 Jul. 27, 2023

(30) Foreign Application Priority Data

Jan. 27, 2022 (JP) ................................. 2022-011087

(51) Int. Cl.
*E02F 9/08* (2006.01)
(52) U.S. Cl.
CPC .................................. *E02F 9/0866* (2013.01)
(58) Field of Classification Search
CPC ..................................................... E02F 9/0866
USPC ......................................................... 180/309
See application file for complete search history.

(56) References Cited

U.S. PATENT DOCUMENTS

| | | | | |
|---|---|---|---|---|
| 4,506,749 A * | 3/1985 | Sieren | ................. | F01N 13/1811 180/69.2 |
| 7,717,205 B2 * | 5/2010 | Kertz | .................... | F01N 13/009 180/69.2 |
| 9,668,404 B2 * | 6/2017 | Minoura | ................. | B60K 13/02 |
| 9,957,695 B2 * | 5/2018 | Takeyama | ................. | E02F 9/00 |
| 10,746,082 B2 * | 8/2020 | Fang | ..................... | F01N 13/107 |
| 11,173,959 B2 * | 11/2021 | Chalifour | ............... | B62D 27/00 |
| 2015/0184361 A1 * | 7/2015 | Imano | ....................... | F01N 3/08 180/309 |
| 2016/0090889 A1 * | 3/2016 | Mahira | ................... | B60K 13/04 180/309 |

(Continued)

FOREIGN PATENT DOCUMENTS

| | | | | |
|---|---|---|---|---|
| JP | 2013049405 A | * | 3/2013 | ............. B60K 11/06 |
| JP | 6400520 B2 | | 11/2016 | |
| JP | 2018-135041 | | 8/2018 | |

(Continued)

OTHER PUBLICATIONS

Japanese Office Action for corresponding JP Application No. 2022-011087, Mar. 11, 2025 (w/ machine translation).

*Primary Examiner* — Hau V Phan
(74) *Attorney, Agent, or Firm* — MORI & WARD, LLP (57) ABSTRACT

An exhaust system includes a vehicle body frame, a bonnet cover provided on the vehicle body frame in a height direction along a height of the vehicle body frame and having a first opening, an exhaust treatment device provided inside a space surrounded by the vehicle body frame and the bonnet cover to treat exhaust from an engine, an exhaust pipe passing through the first opening. The exhaust pipe has an intake port connected to the exhaust treatment device and an exhaust port provided outside the space opposite to the intake port. A muffler cover is provided on the bonnet cover in the height direction, covers the first opening, and has a second opening in a portion facing the exhaust port. A baffle plate is configured to cover a gap between the bonnet cover and the exhaust port in the height direction.

20 Claims, 9 Drawing Sheets

(56) References Cited

U.S. PATENT DOCUMENTS

2016/0193912 A1* 7/2016 Minoura ................ B60K 13/04
180/309
2022/0034065 A1  2/2022 Kimura et al.

FOREIGN PATENT DOCUMENTS

JP   2022-028353   2/2022
WO  WO-2019131721 A1 *  7/2019  ............... B60N 2/75

* cited by examiner

WORK VEHICLE

CROSS-REFERENCE TO RELATED APPLICATIONS

The present application claims priority under 35 U. S. C. § 119 to Japanese Patent Application No. 2022-011087, filed Jan. 27, 2022. The contents of this application are incorporated herein by reference in their entirety.

BACKGROUND OF THE INVENTION

Field of the Invention

Disclosed embodiments relate to a work vehicle and an exhaust system provided in a work vehicle.

Discussion of the Background

Japanese Patent No. 6400520 discloses an exhaust system provided in a work vehicle having a freely openable and closable cabin.

SUMMARY OF THE INVENTION

According to one aspect of the present disclosure, an exhaust system includes a vehicle body frame, a bonnet cover, an exhaust treatment device, an exhaust pipe, a muffler cover, and a baffle plate. The bonnet cover is provided on the vehicle body frame in a height direction along a height of the vehicle body frame and has a first opening. The exhaust treatment device is provided inside a space surrounded by the vehicle body frame and the bonnet cover to treat exhaust from an engine. The exhaust pipe passes through the first opening. The exhaust pipe includes an intake port connected to the exhaust treatment device and an exhaust port provided outside the space opposite to the intake port. The muffler cover is provided on the bonnet cover in the height direction and covers the first opening. The muffler cover includes a second opening in a portion facing the exhaust port. The baffle plate is configured to cover a gap between the bonnet cover and the exhaust port in the height direction.

According to another aspect of the present invention, a work vehicle is provided with an exhaust system according to the first aspect.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Hereinafter, the present invention will be described in detail with reference to drawings showing embodiments thereof. In the drawings, the same reference numerals indicate corresponding or substantially identical configurations.

Exemplary Embodiment

<Overall Configuration>

Figure 1:
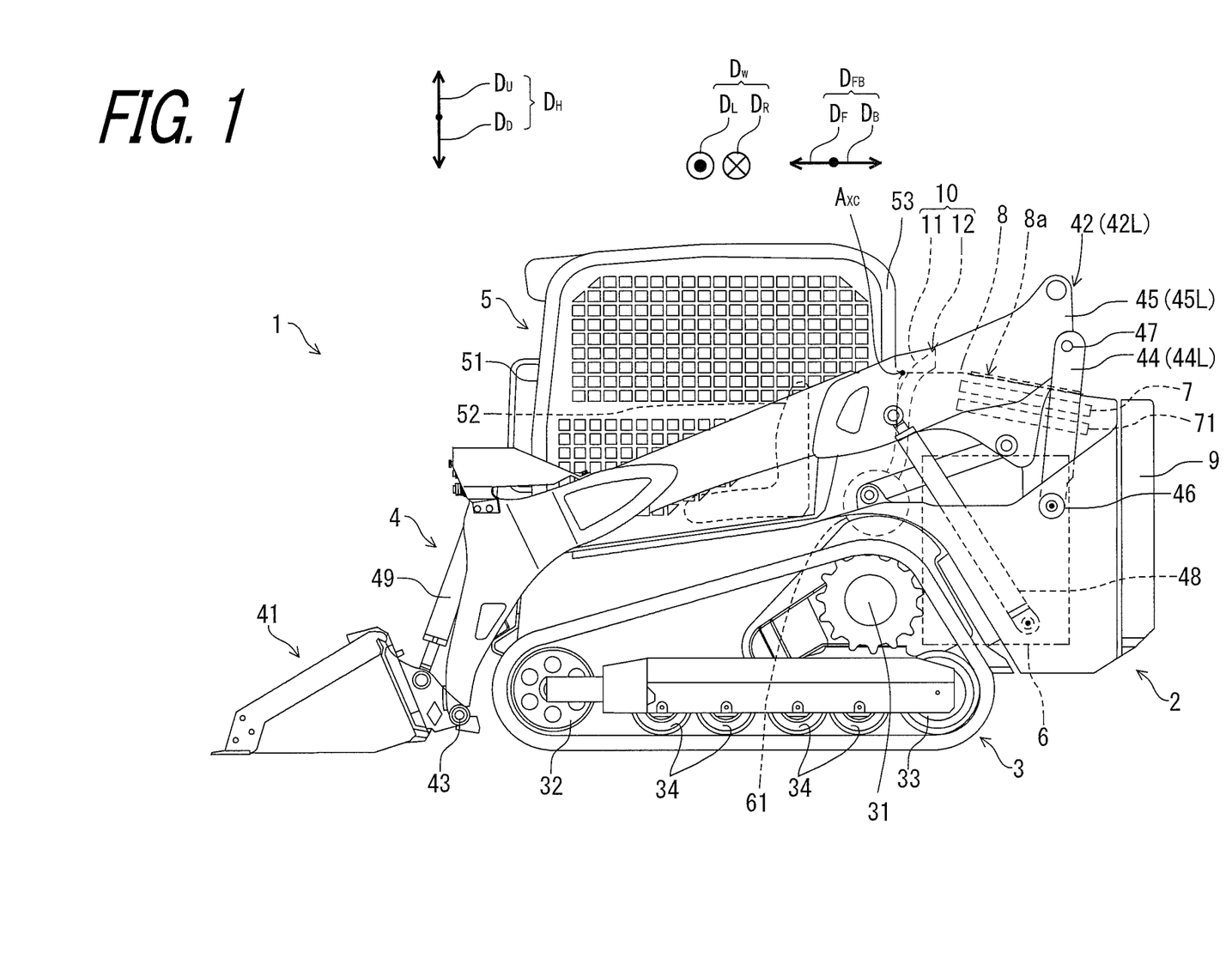
FIG. 1 is a side view of a work vehicle.
Figure 2:
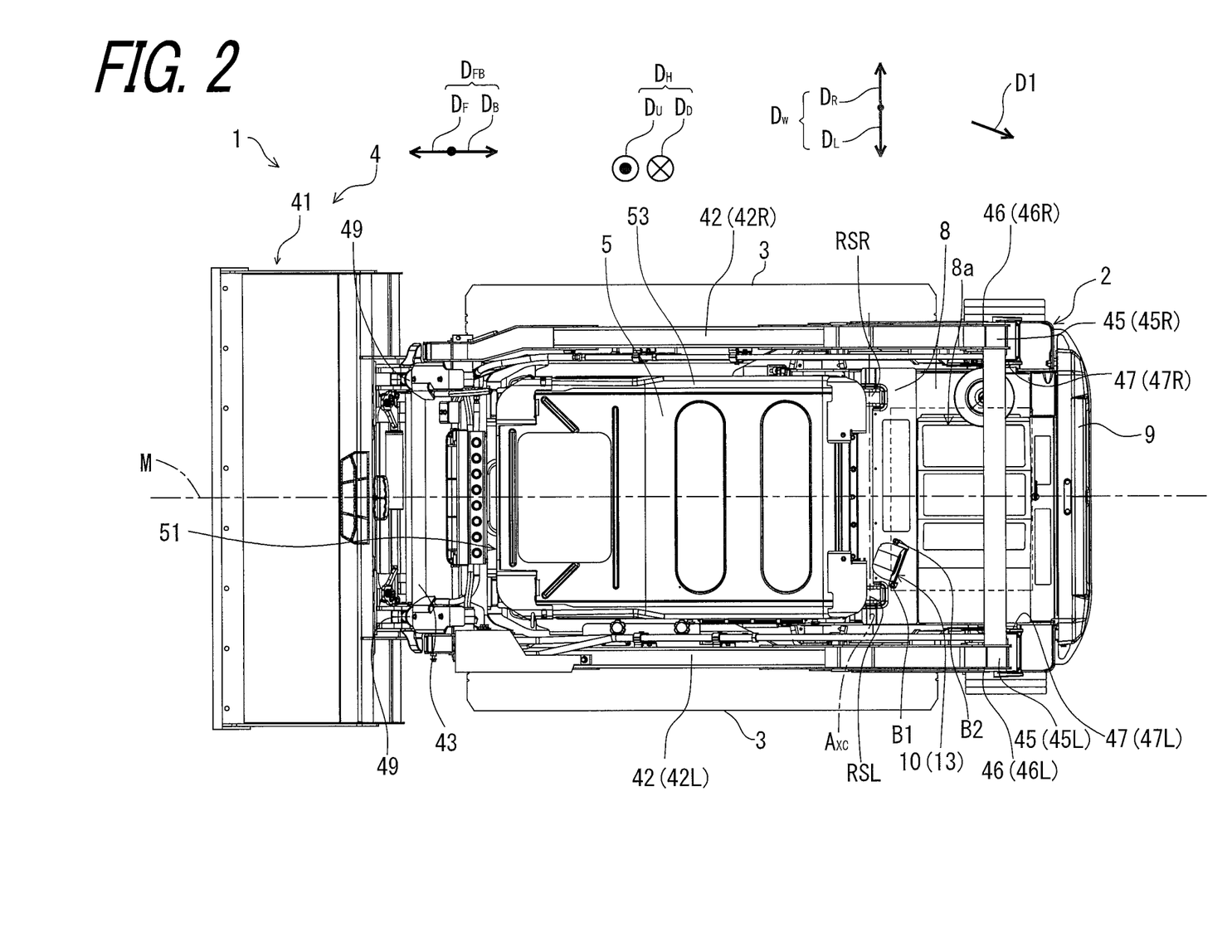
FIG. 2 is a top view of a work vehicle.
Figure 3:
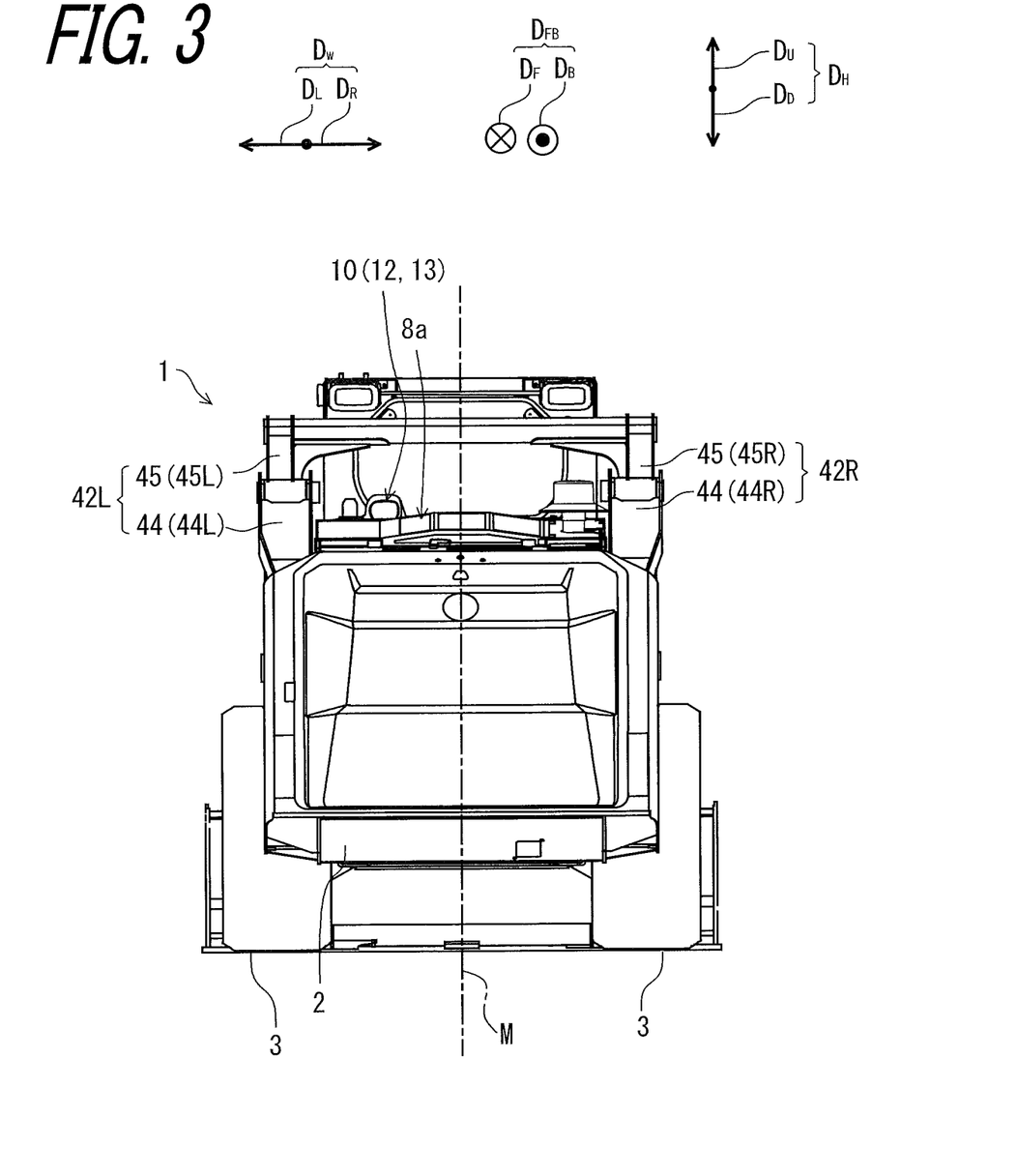
FIG. 3 is a rear view of a work vehicle.

Referring to FIGS. 1-3, a work vehicle 1, such as a compact truck loader, includes an exhaust system 10. A work vehicle 1 includes a vehicle body frame 2, a traveling device 3, a working device 4, and a cabin 5. The vehicle body frame 2 supports the traveling device 3, the working device 4, and the cabin 5. In the illustrated embodiment, the traveling device 3 is a crawler type traveling device. Therefore, the traveling device 3 includes drive wheels 31, driven wheels 32 and 33, and rolling wheels 34. However, the traveling device 3 is not limited to a crawler type traveling device. The traveling device 3 may be, for example, a front wheel/rear wheel traveling device, or a traveling device having a front wheel and a rear crawler. The working device 4 includes work equipment bucket 41 at the distal end of working device 4. A proximal end of the working device 4 is attached to a rear portion of the vehicle body frame 2. The working device 4 includes a pair of arms 42 for rotatably supporting the bucket 41 via the bucket pivot shaft 43. Each of the pair of arms 42 includes a lift link 44 and a boom 45.

The lift link 44 is rotatable around a fulcrum shaft 46Is with respect to the vehicle body frame 2. The boom 45 is rotatable around a joint shaft 47 with respect to the lift link 44. The working device 4 further includes a plurality of boom cylinders 48 and at least one equipment cylinder 49. Each of the plurality of boom cylinders 48 is rotatably connected to the vehicle body frame 2 and the boom 45, and moves the lift link 44 and the boom 45 to move up and down the bucket 41. At least one equipment cylinder 49 is configured to tilt the bucket 41. The cabin 5 is attached to a front portion of the vehicle body frame 2. The work vehicle 1 includes a front door 51 in front of a cabin 5, and a driver's seat 52 and an operating device (not illustrated) in the cabin 5. An internal space of the cabin 5 is defined by a cab frame 53. As shown in FIG. 2, the cab frame 53 is rotatable about rotational shafts RSL and RSR on the vehicle body frame 2. In FIGS. 1 and 2, a common rotational axis $A_{XC}$ defined by the rotational axes RSL and RSR is illustrated.

In the embodiment according to the present the embodiment according to the present application, the longitudinal direction $D_{FB}$ (forward $D_F$/rearward $D_B$) means a front-rear direction (forward/rearward) as seen from an operator seated on the driver's seat 52 of the cabin 5. $D_L$ in the left direction, $D_R$ in the right direction, width direction $D_W$ mean "left direction," "right direction," and "left/right direction", respectively, when viewed from the operator. Up direction $D_U$, down direction $D_D$; height direction $D_H$. mean an upward direction, a downward direction and a height direction as seen from the operator. The front/back, left/right (width), up/down (height) directions of the work vehicle 1 correspond to the front/back, left/right (width), up/down (height) directions as viewed from the operator.

In FIG. 1, one of the pair of arms 42 is provided on the left side of the cabin 5. The other of the pair of arms 42 is provided on the right side of the cabin 5. More specifically, one of the boom cylinder 48 and one of the boom 45 are provided on the left side of the cabin 5. The other boom cylinder 48 and the other boom 45 are provided on the right side of the cabin 5. FIG. 1 shows the left side of the work vehicle 1. As shown in FIGS. 2 and 3, the vehicle body frame 2 is substantially symmetrical with respect to the vehicle body center plane M, and among the pair of arms 42, an arm 42 provided on the left side with respect to the vehicle body center plane M is shown as a first arm 42L, and an arm 42 provided on the right side with respect to the vehicle body center plane M is shown as a second arm 42R. The lift link 44 provided on the left side with respect to the vehicle body center plane M is shown as a first lift link 44L, and the lift link 44 provided on the right side with respect to the vehicle body center plane M is shown as a second lift link 44R. A boom 45 provided on the left side with respect to the vehicle body center plane M is shown as a first boom 45L, and a boom 45 provided on the right side with respect to the vehicle body center plane M is shown as a second boom 45R. A fulcrum shaft 46 provided on the left side with respect to the vehicle body center plane M is shown as the first fulcrum shaft 46L, and a fulcrum shaft 46 provided on the right side of the vehicle body center plane M is shown as the second fulcrum shaft 46R. A joint shaft 47 provided on the left side with respect to the vehicle body center plane M is shown as a first joint shaft 47L, and a joint shaft 47 provided on the right side with respect to the vehicle body center plane M is shown as a second joint shaft 47R.

Referring to FIG. 1, the work vehicle 1 further includes an engine 6 and a heat exchanger 7 provided at a rear portion of the vehicle body frame 2. The engine 6 is configured to provide driving force to the traveling device 3 and the working device 4. The heat exchanger 7 includes a radiator for cooling the refrigerant of the engine 6. Further, preferably, the heat exchanger 7 includes an oil cooler configured to cool hydraulic fluid used in the hydraulic system of the work vehicle 1 e.g., boom cylinder 48 and at least one equipment cylinder 49. The work vehicle 1 includes a fan 71 for air-cooling the heat exchanger 7. The engine 6 and the heat exchanger 7 are provided between a pair of arms 42 in the width direction $D_W$ of the work vehicle 1.

The work vehicle 1 further includes a bonnet cover 8 for covering the heat exchanger 7. The bonnet cover 8 further covers the engine 6. An intake port 8a for taking air into the inside of the cover 8 is provided on the upper surface of the bonnet cover 8. The work vehicle 1 further includes a rear bonnet cover 9 provided at the rear end of the vehicle body frame 2. The rear bonnet cover 9 is openable and closable, thereby a maintenance worker can perform maintenance work on the engine 6 and the like.

An exhaust system 10 includes an exhaust pipe 11, one end of which is connected to an engine 6, and an exhaust port 12 connected to the exhaust pipe 11. More specifically, the exhaust pipe 11 is connected to the engine 6 via an exhaust treatment device 61 for treating exhaust from the engine 6. The exhaust treatment device 61 includes, for example, a particulate removal filter. However, the exhaust treatment device 61 may include a selective reduction catalyst device. Referring to FIG. 2, the exhaust system 10 is provided near the middle between the first arm 42L and the vehicle body center plane M in the width direction $D_W$ of the work vehicle 1.

Figure 4:
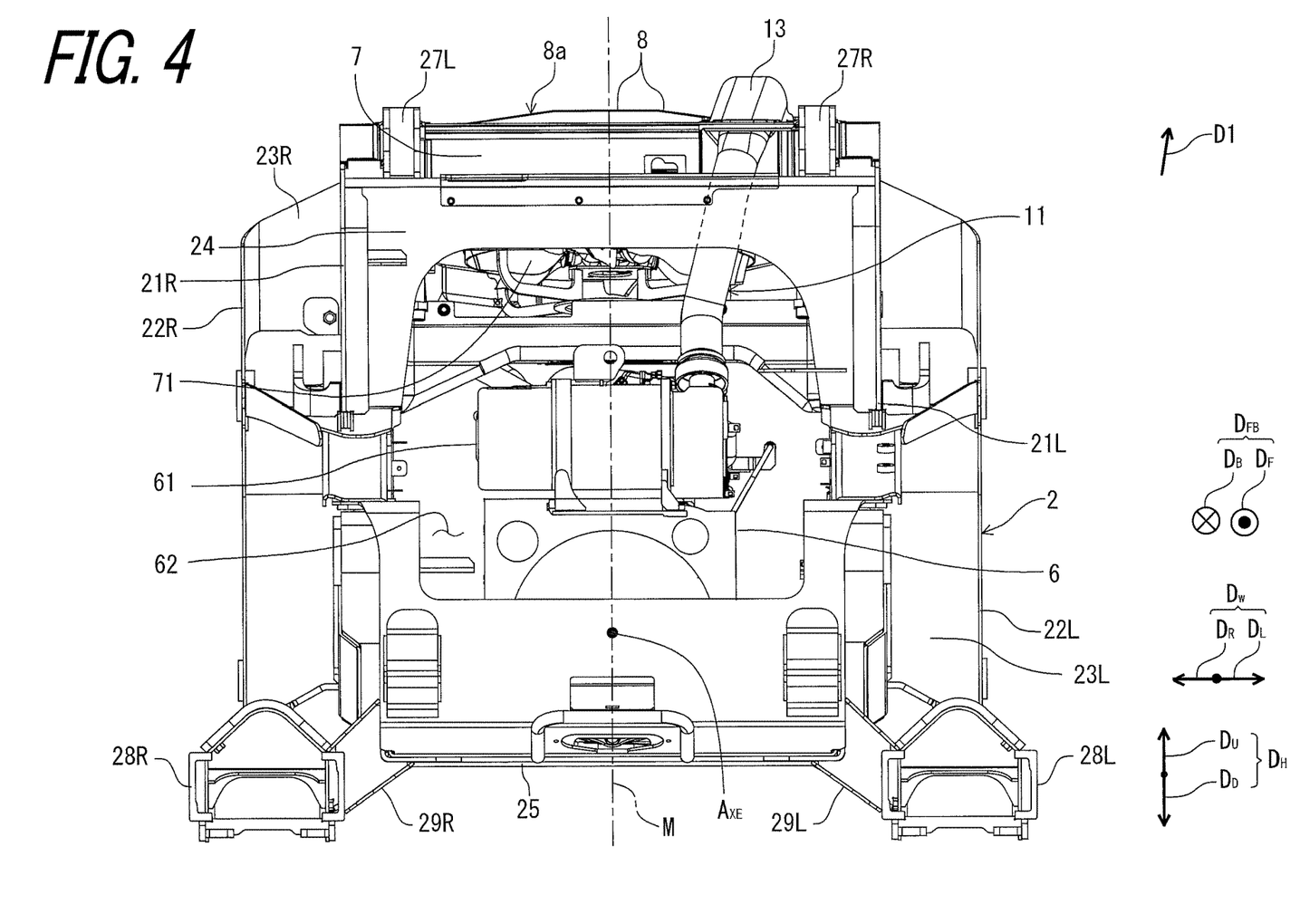
FIG. 4 is a view of a part of the work vehicle as viewed from the front end of the work vehicle toward the rear.

FIG. 4 is a view of a part of the work vehicle 1 as viewed from the front end of the work vehicle 1 toward the rear $D_B$. In FIG. 4, a vehicle body frame 2, an engine 6, an exhaust treatment device 61, an exhaust system 10, a heat exchanger 7, a fan 71, and a bonnet cover 8 are shown and other than those are not shown. Referring to FIG. 4, the vehicle body frame 2 includes a first inner wall 21L, the second inner wall 21R, a first outer wall 22L, a second outer wall 22R, a first rear wall 23L, a second rear wall 23R, an upper wall 24, a bottom wall 25, a first track frame 28L, a second track frame 28R, a first mounting frame 29L, and a second mounting frame 29R.

The first inner wall 21L and the second inner wall 21R connects with the upper wall 24 and the bottom wall 25 and extends in the height direction $D_R$. The first outer wall 22L faces the first inner wall 21L in the width direction $D_W$ and extends in the height direction $D_H$. The second outer wall 22R faces the second inner wall 21R in the width direction $D_W$ and extends in the height direction $D_H$. The first inner wall 21L and the first outer wall 22L are located on the left side with respect to the vehicle body center plane M. The second inner wall 21R and the second outer wall 22R I is located on the right side with respect to the vehicle body center plane M. The first inner wall 21L is positioned between the first outer wall 22L and the vehicle body center plane M in the width direction $D_W$. The second inner wall 21R is located between the second outer wall 22R and the vehicle body center plane M in the width direction $D_W$. The first rear wall 23L connects the rear end of the first inner wall 21L and the rear end of the first outer wall 22L. The second rear wall 23R connects the rear end of the second inner wall 21R and the rear end of the second outer wall 22R. The bottom wall 25 connects the lower end of the first inner wall 21L and the lower end of the second inner wall 21R. The upper wall 24 connects the upper end of the first inner wall 21L and the upper end of the second inner wall 21R. The upper wall 24 is opposed to the bottom wall 25 in the height direction $D_H$. The upper wall 24 has a first support portion 27L for rotatably supporting the rotational axis RSL and a second support portion 27R for rotatably supporting the rotational axis RSR.

The first lift link 44L, the first arm 42L, and the boom cylinder 48 for operating the first arm 42L are arranged between the first inner wall 21L and the first outer wall 22L in the width direction $D_W$. A first fulcrum shaft 46L supporting the first lift link 44L is connected to the first inner wall 21L and the first outer wall 22L. The second lift link 44R, the second arm 42R, and the boom cylinder 48 for operating the second arm 42R are provided between the second inner wall 21R and the second outer wall 22R in the width direction $D_W$. A second fulcrum shaft 46R supporting the second lift link 44R is connected to the second inner wall 21R and the first outer wall 22L.

The first track frame 28L is attached to the lower end of the first inner wall 21L via a first mounting frame 29L. The second track frame 28R is attached to the lower end of the second inner wall 21R via a second mounting frame 29R. Driven wheels 32 and 33 and rolling wheels 34 are rotatably attached to the first track frame 28L and the second track frame 28R. The drive wheel 31 is supported by the first inner wall 21L and the second inner wall 21R. The engine 6 is supported by the bottom wall 25 through a damper (not illustrated). In FIG. 4, in order to define the direction of the engine 6, the crankshaft $A_{XE}$ is illustrated. The crankshaft $A_{XE}$ extends substantially in the longitudinal direction $D_{FB}$ on the vehicle body center plane M.

Figure 5:
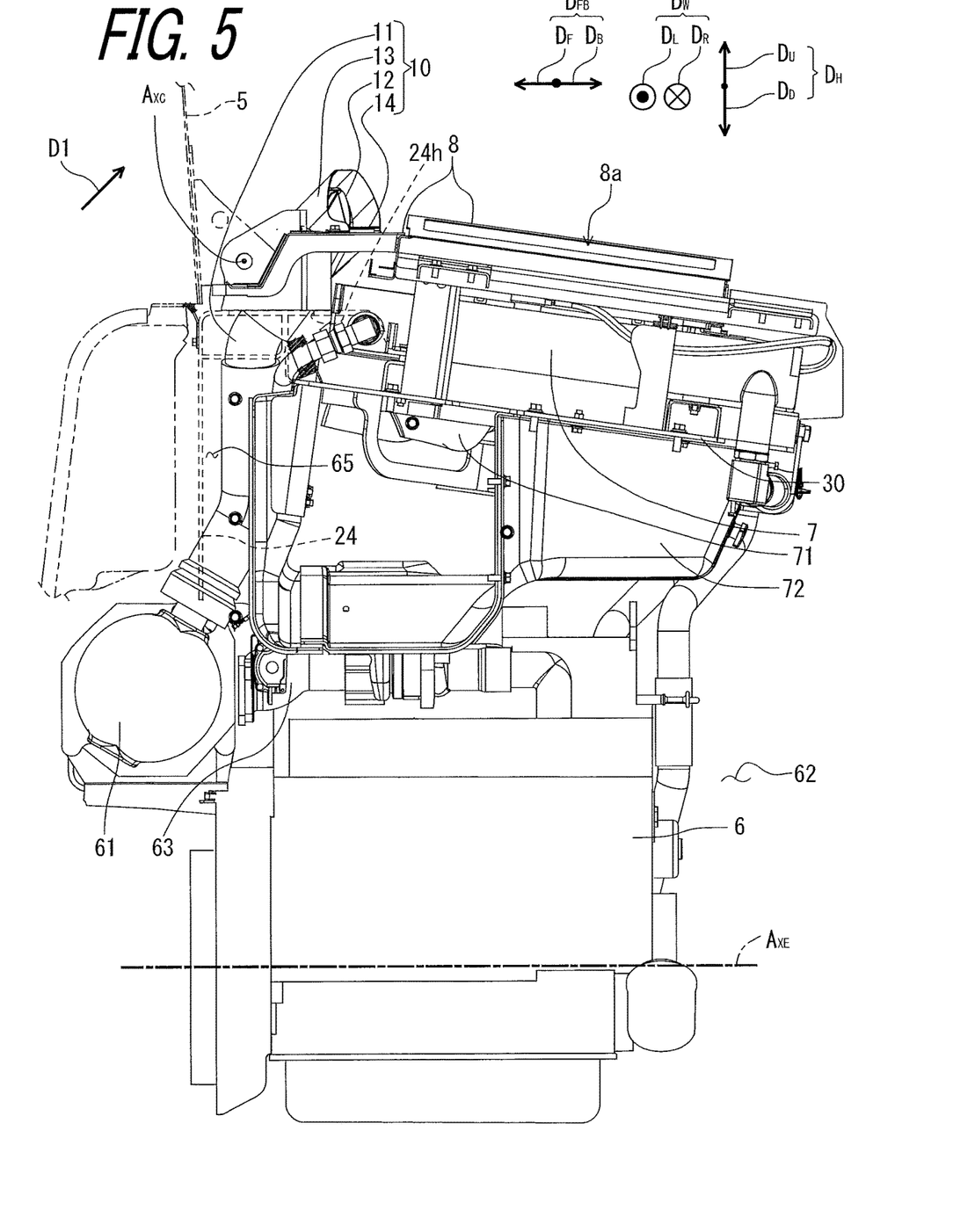
FIG. 5 is a side view of the periphery of the engine.

FIG. 5 is a side view of the periphery of the engine 6 shown in FIG. 4. In FIG. 5, the display of the vehicle body frame 2 excluding the upper wall 24 is omitted. In addition, the structure of the engine 6 is shown schematically, and a part of the structure of the engine 6 is not shown. As shown in FIG. 5, the heat exchanger 7, the fan 71, and the bonnet cover 8 are attached to the first inner wall 21L and the second inner wall 21R via the stay 30. That is, the bonnet cover 8 is provided on the vehicle body frame 2 in the height direction $D_H$ along the height of the vehicle body frame 2. The upper wall 24 is illustrated by a dotted line. Referring to FIGS. 4 and 5, the upper wall 24 has an L-shaped shape bent downward at its front end. The upper wall 24 has a through hole 24h, and in which the exhaust pipe 11 is disposed so as to pass through the through hole 24h.

Further, referring to FIGS. 4 and 5, the fan 71 is located in the upper portion $D_U$ of the engine. The heat exchanger 7 is located above $D_U$ of the fan 71. The bonnet cover 8 having the intake port 8a is located in the upper portion $D_U$ of the heat exchanger 7. As the fan 71 rotates, air is sent from the intake port 8a to the heat exchanger 7. A fan duct 72 is provided between the fan 71 and the engine 6, and the fan duct 72 prevents the air heated through the heat exchanger 7 from flowing into the engine chamber 62. The fan duct 72 also prevents outside air containing dust from flowing into the engine chamber 62. In FIGS. 4 and 5, the fan 71 is shown because a part of the fan duct 72 is not shown, but actually, the fan 71 is not exposed to the engine chamber 62 because it is covered with the fan duct 72. The engine chamber 62 is a space surrounded by the cabin 5, the fan duct 72, the first inner wall 21L, the second inner wall 21R, the bottom wall 25, and the rear bonnet cover 9. In other words, the engine chamber 62 is a space surrounded by the vehicle body frame 2 and the bonnet cover 8.

The exhaust treatment device 61 is provided in front $D_F$ of the engine 6 in the engine chamber 62, and is connected to the engine 6 by a connection pipe 63. The connection pipe 63 is connected at the right end of the exhaust treatment device 61. As shown in FIG. 4, an intake port of the exhaust pipe 11 is connected at the left end of the exhaust treatment device 61. An exhaust port 12 is provided on the opposite side of the intake port of the exhaust pipe 11. The exhaust port 12 is fixed to the exhaust pipe 11 by press-fitting, adhesive, welding, or the like. That is, the exhaust pipe 11 has the exhaust port 12. As shown in FIGS. 4 and 5, the exhaust port 12 is protected by being covered with a muffler cover 13. That is, the exhaust system 10 includes the muffler cover 13. The muffler cover 13 is fixed to the bonnet cover 8 by bolts B1, B2, etc. As shown in FIGS. 2 and 5, the exhaust port 12 faces the intake port 8a.

Figure 6:
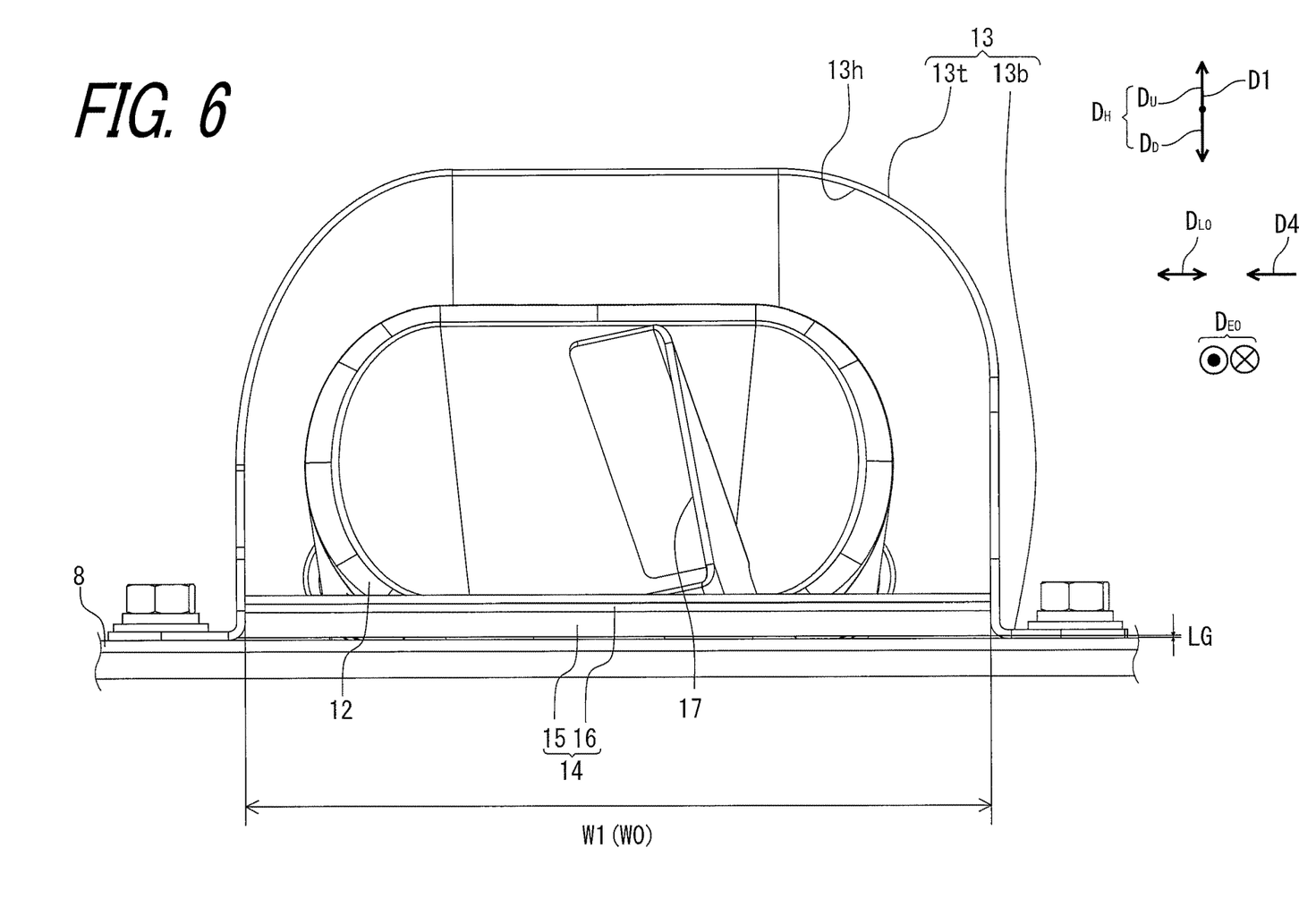
FIG. 6 is an enlarged view of an exhaust pipe and an exhaust port.
Figure 7:
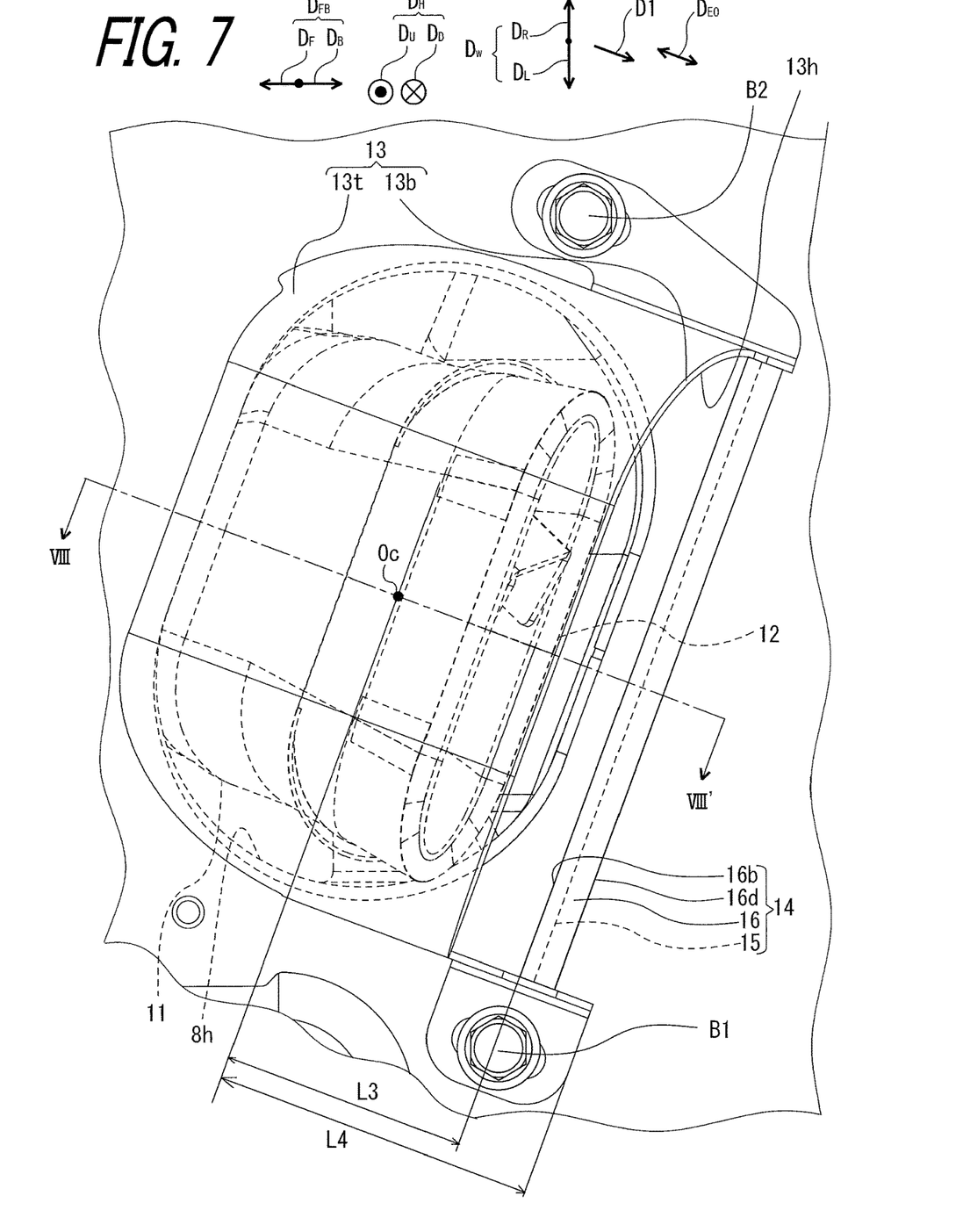
FIG. 7 is an enlarged view of the muffler cover and the exhaust port as viewed from above.
Figure 8:
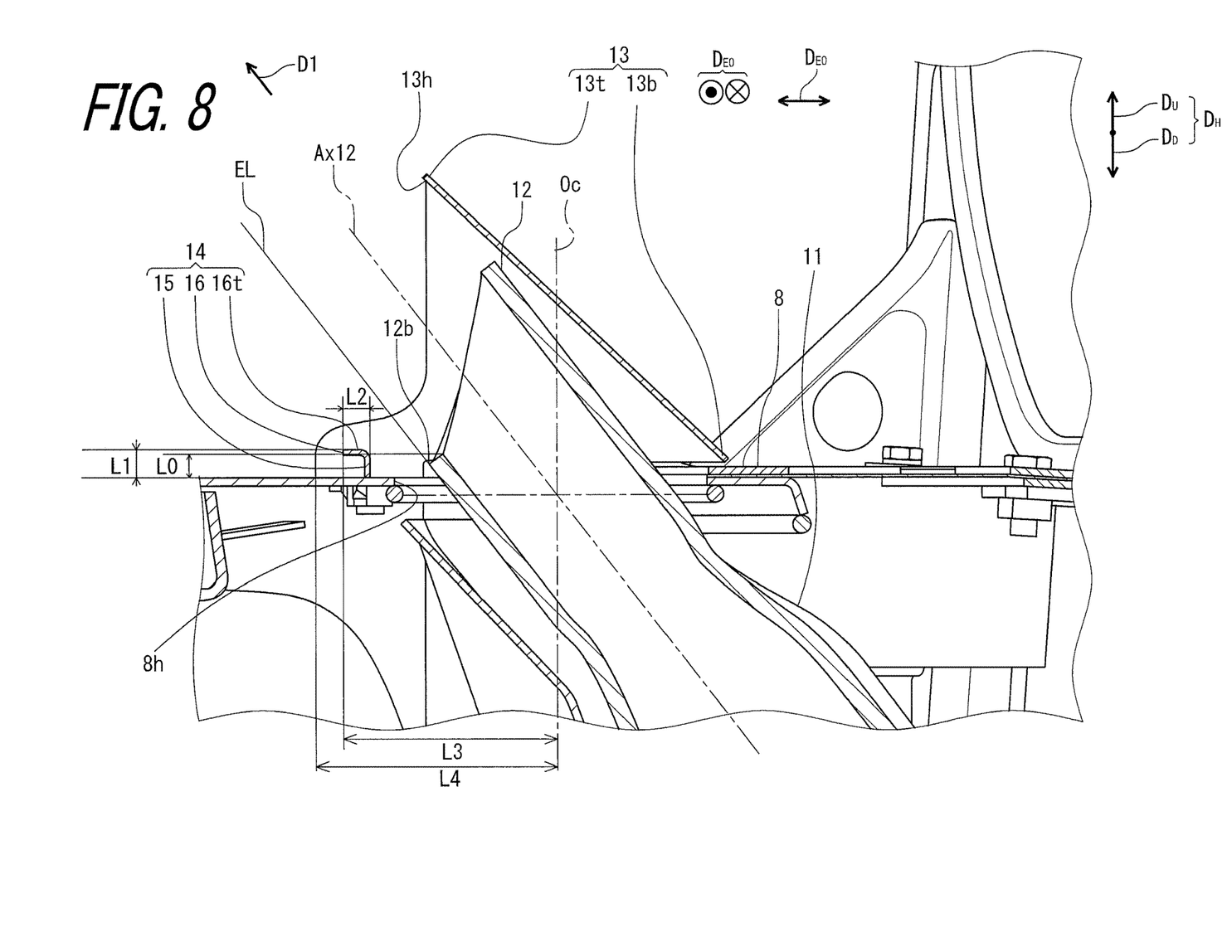
FIG. 8 is a cross-sectional view taken along the cross-sectional line XIII-XIII' of FIG. 7.

FIG. 6 is an enlarged view of the exhaust port 12 and the muffler cover 13 when the exhaust port 12 is viewed in front. FIG. 7 is an enlarged view of an upper portion of the exhaust port 12 and the muffler cover 13 shown in FIG. 2. FIG. 8 is a cross-sectional view indicated by the cut plane line VIII-VIII' shown in FIG. 7. Referring to FIG. 6 and the like, the exhaust port 12 has a long hole pipe shape. Referring to FIG. 8, the central axis Ax12 of the exhaust port 12 is in the exhaust direction. Referring to FIGS. 7 and 8, the bonnet cover 8 has a first opening 8h. Referring to FIGS. 6 to 8, the exhaust pipe 11 passes through the first opening 8h, and the exhaust port 12 is disposed outside the engine chamber 62. A part of the exhaust port 12 may be disposed closer to the engine chamber 62 than the first opening 8h. The first opening 8h communicates with the engine chamber 62 through a gap 65 (see FIG. 5). Therefore, the outside air entering through the first opening 8h can cool the exhaust pipe 11 and suppress the temperature rise in the engine chamber 62, but there is a possibility that dust enters the engine chamber 62 (particularly near the exhaust treatment device 61) through the first opening 8h.

Referring to FIG. 6, the exhaust port 12 includes an wind guide plate 17 for changing the direction in which air is exhausted in the width direction $D_{LO}$ from the exhaust direction D1. The width direction $D_{LO}$ is a direction perpendicular to the direction of a vector obtained by projecting the exhaust direction D1 onto a plane (horizontal plane) perpendicular to the height direction $D_H$. Specifically, in the bilateral width direction $D_{LO}$, the wind guide plate 17 is configured to change exhaust direction from the exhaust direction D1 to the wind guide direction D4 which moves away from the vehicle body center plane M in the bilateral width direction $D_{LO}$. Referring to FIG. 6, the wind guide plate 17 is provided inside the exhaust port 12.

Referring to FIGS. 6 to 8, the muffler cover 13 is provided on the bonnet cover 8 in the height direction $D_H$. The muffler cover 13 has a cover proximal end 13b in contact with the bonnet cover 8 and a cover distal end 13t on the opposite side of the cover proximal end 13b in the exhaust direction D1. The muffler cover 13 has a second opening 13h in a portion facing the exhaust port 12, and covers the first opening 8h.

Referring to FIGS. 5-8, the exhaust system 10 includes a baffle plate 14 that covers the gap between the bonnet cover 8 and the exhaust port 12 in the height direction $D_H$. The baffle plate 14 is a L shaped member, which includes a upright portion 15 extending in the height direction $D_H$ and extending portion 16 extending in an extending direction $D_{EO}$ perpendicular to the longitudinal axis of the L-shaped member. The extending direction $D_{EO}$ is a bilateral direction parallel to the direction of a vector obtained by projecting the exhaust direction D1 onto a plane (horizontal plane) perpendicular to the height direction $D_H$. The baffle plate 14 extends in the width direction $D_{LO}$ perpendicular to the height direction $D_H$. The length W1 of the baffle plate 14 in the width direction $D_{LO}$ is equal to or greater than the length W0 of the second opening 13h in the width direction $D_{LO}$. More specifically, the length W1 of the baffle plate 14 in the width direction $D_{LO}$ is substantially equal to the length W0 of the second opening 13h in the width direction $D_{LO}$. The length W1 of the baffle plate 14 in the width direction $D_{LO}$ is substantially equal to the length W0 of the second opening 13h in the width direction $D_{LO}$. Thus, the baffle plate 14 can prevent dust from entering the engine chamber 62 through the second opening 13h. The baffle plate 14 is formed integrally with the muffler cover 13. Thus, the baffle plate 14 can be easily attached to the bonnet cover 8. However, the baffle plate 14 may be attached to the bonnet cover 8 by welding or bolts.

Figure 9:
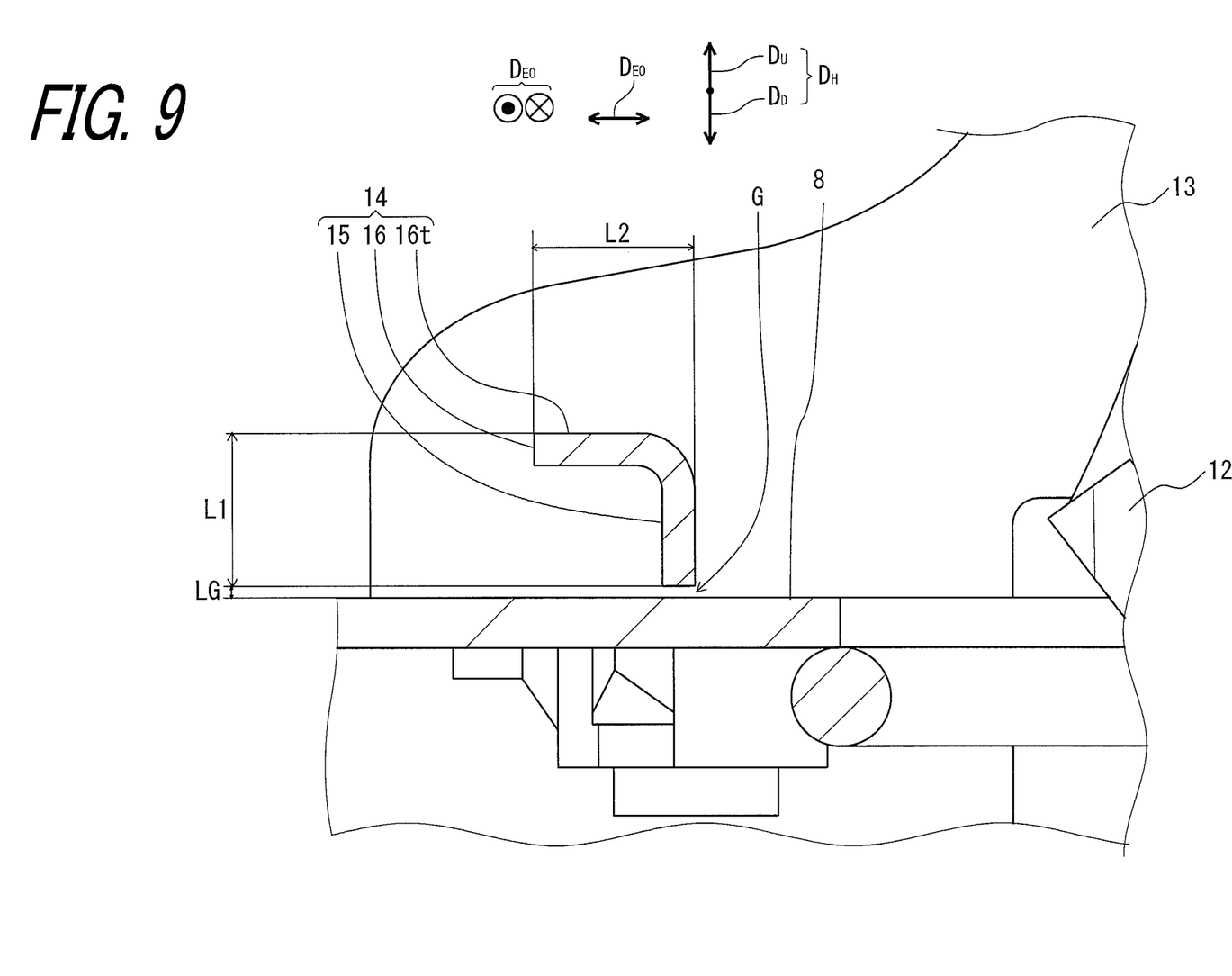
FIG. 9 is an enlarged view of the vicinity of the baffle plate of FIG. 8.

Referring to FIG. 8, the upper end 16t in the height direction $D_H$ of the extending portion 16 is located below a straight line EL extending in the exhaust direction D1 from the lower end 12b of the exhaust port 12 in the height direction $D_H$. As a result, the effect of a baffle plate 14 on the flow of exhaust is minimized, and the temperature inside an exhaust pipe 11 is prevented from rising due to deterioration of the flow of exhaust. Further, a length L1 of the baffle plate 14 in the height direction $D_H$ is longer than a distance LO in the height direction $D_H$ between the lower end 12b of the exhaust port 12 and the bonnet cover 8. Thus, the baffle plate 14 can prevent dust from entering the engine chamber 62 through the second opening 13h. The length L1 in the height direction $D_H$ of the baffle plate 14 is substantially equal to the length L2 in the extending direction $D_{EO}$ of the baffle plate 14. As a result, it is possible to prevent a failure caused by a mistake in mounting the length L1 and the length L2. FIG. 9 is an enlarged view of the vicinity of the baffle plate 14 shown in FIG. 8. Referring to FIGS. 6 and 9, the baffle plate 14 is not in contact with the bonnet cover 8, and separated from the bonnet cover 8. The distance LG of the gap G between the baffle plate 14 and the bonnet cover 8 in the height direction $D_H$ is smaller than 1/10 of the length L1 of the baffle plate 14 in the height direction $D_H$. Specifically, the distance LG is shorter than 1 mm. Since such a minute gap G is provided between the baffle plate 14 and the bonnet cover 8, the air flowing in the space surrounded by the upright portion 15 and the extending portion 16 is not swirled and comes out of the gap G, so that the dust caught in the baffle plate 14 is not wound upward. In addition, the gap G is small enough to prevent dust from passing through. Therefore, the baffle plate 14 can effectively prevent dust from entering through the first opening 8h.

Referring to FIGS. 7 and 8, the extending portion 16 includes a base end 16b intersecting with the upright portion 15 and a plate end portion 16d located opposite to the plate base end 16b in the extending direction $D_{EO}$, and a distance L3 in the extending direction $D_{EO}$ between the plate end portion 16d and the center $O_c$ of the first opening 8h is shorter than a distance L4 in the extending direction $D_{EO}$ between the cover distal end 13t and the center $O_c$ of the first opening 8h. Since the baffle plate 14 is provided inside the muffler cover 13, the baffle plate 14 can further prevent dust from entering the engine chamber 62 through the second opening 13h.

Operation and Effect of the Embodiment

An exhaust system 10 of a work vehicle 1 according to the present embodiments includes a bonnet cover 8 having a first opening 8h, an exhaust pipe 11 which passes through the first opening 8h, is connected to an exhaust treatment device 61, and has an exhaust port 12 arranged outside an engine chamber 62, a muffler cover 13 which is provided on the bonnet cover 8 in the height direction $D_H$, has a second opening 13h in a portion facing the exhaust port 12, and covers the first opening 8h, and a baffle plate 14 which covers a gap between the bonnet cover 8 and the exhaust port 12 in the height direction $D_H$. As a result, dust is prevented from falling in the vicinity of the exhaust treatment device 61, which is provided in the space (engine chamber 62) surrounded by the vehicle body frame 2 and the bonnet cover 8 and treats exhaust from the engine 6.

As used herein, "comprising" and its derivatives are non-limiting terms that describe the presence of a component, and do not exclude the presence of other components not described. This also applies to "having", "including" and their derivatives.

The terms "member," "part," "element," "body," and "structure" may have multiple meanings, such as a single part or multiple parts.

Ordinal numbers such as "first" and "second" are simply terms used to identify configurations and do not have other meanings (e.g., a particular order). For example, the presence of the "first element" does not imply the presence of the "second element", and the presence of the "second element" does not imply the presence of the "first element".

Terms such as "substantially", "about", and "approximately" indicating degrees can mean reasonable deviations such that the final result is not significantly altered, unless otherwise stated in the embodiments. All numerical values described herein may be interpreted to include words such as "substantially," "about," and "approximately."

In the present application, the phrase "at least one of A and B" should be interpreted to include only A, only B, and both A and B.

In view of the above disclosure, it will be apparent that various changes and modifications of the present invention are possible. Therefore, the present invention may be carried out by a method different from the specific disclosure of the present application without departing from the spirit of the present invention.

What is claimed is:

1. A work vehicle comprising:
a vehicle body frame;
a cabin provided on the vehicle body frame;
a first arm provided on a left side of the cabin;
a second arm provided on a right side of the cabin, the right side being opposite to the left side in a width direction, the first arm and the second arm being configured to rotatably support a work implement;
a bonnet cover provided on the vehicle body frame in a height direction perpendicular to the width direction, the bonnet cover comprising:
an air intake through which air is taken into a a space surrounded by the vehicle body frame and the bonnet cover; and
a first opening provided between the air intake and the cabin in a front-rear direction perpendicular to the height direction and to the width direction;
an engine provided behind the cabin in the front-rear direction inside the space to generate motive power to move the first arm and the second arm;
an exhaust treatment device provided in the space and connected to the engine to treat exhaust from the engine;
a heat exchanger provided between the air intake and the engine in the height direction;
a fan provided in the space to suck the air through the air intake to air-cool the heat exchanger;
an exhaust pipe passing through the first opening and including:
an intake port connected to the exhaust treatment device; and
an exhaust port provided outside the space opposite to the intake port;
a muffler cover provided on the bonnet cover in the height direction and covering the first opening, the muffler cover including a second opening in a portion facing the exhaust port, the second opening being opened rearward in the front-rear direction; and
a baffle plate configured to cover a gap between the bonnet cover and the exhaust port in the height direction.

2. The work vehicle according to claim 1, wherein the baffle plate extends in the width direction, and a length of the baffle plate in the width direction is equal to or greater than a length of the second opening in the width direction.

3. The work vehicle according to claim 2, wherein the length of the baffle plate in the width direction is substantially equal to the length of the second opening in the width direction.

4. The work vehicle according to claim 3, wherein the baffle plate is a L-Shaped member including:
an upright portion extending in the height direction; and
an extending portion extending in an extending direction.

5. The work vehicle according to claim 4, wherein
the exhaust port has a central axis directed in an exhaust direction, and
an upper end of the extending portion in the height direction is located below a straight line extending in the exhaust direction from a lower end of the exhaust port in the height direction, as viewed in the width direction.

6. The work vehicle according to claim 5, wherein
a length of the baffle plate in the height direction is longer than a distance in the height direction between the lower end of the exhaust port and the bonnet cover.

7. The work vehicle according to claim 6, wherein
the muffler cover includes:
 a cover proximal end in contact with the bonnet cover; and
 a cover distal end opposite to the cover proximal end in the exhaust direction;
the extending portion includes a plate base end intersecting with the upright portion and a plate end portion opposite to the plate base end in the extending direction, and
a distance between the plate end portion and a center of the first opening in the extending direction is shorter than a distance between the cover distal end and the center of the first opening in the extending direction.

8. The work vehicle tem according to claim 5, wherein
the muffler cover includes:
 a cover proximal end in contact with the bonnet cover; and
 a cover distal end opposite to the cover proximal end in the exhaust direction;
the extending portion includes a plate base end intersecting with the upright portion and a plate end portion opposite to the plate base end in the extending direction, and
a distance between the plate end portion and a center of the first opening in the extending direction is shorter than a distance between the cover distal end and the center of the first opening in the extending direction.

9. The work vehicle according to claim 4, wherein
a length of the baffle plate in the height direction is longer than a distance in the height direction between a lower end of the exhaust port and the bonnet cover.

10. The work vehicle according to claim 2, wherein the baffle plate is a L-shaped member including:
 an upright portion extending in the height direction; and
 an extending portion extending in an extending direction.

11. The work vehicle according to claim 10, wherein
the exhaust port has a central axis being directed in an exhaust direction, and
an upper end of the extending portion in the height direction is located below a straight line extending in the exhaust direction from a lower end of the exhaust port in the height direction, as viewed in the width direction.

12. The work vehicle according to claim 11, wherein
a length of the baffle plate in the height direction is longer than a distance in the height direction between the lower end of the exhaust port and the bonnet cover.

13. The work vehicle according to claim 12, wherein
the muffler cover includes:
 a cover proximal end in contact with the bonnet cover; and
 a cover distal end opposite to the cover proximal end in the exhaust direction;
the extending portion includes a plate base end intersecting with the upright portion and a plate end portion opposite to the plate base end in the extending direction, and
a distance between the plate end portion and a center of the first opening in the extending direction is shorter than a distance between the cover distal end and the center of the first opening in the extending direction.

14. The work vehicle according to claim 10, wherein
a length of the baffle plate in the height direction is longer than a distance in the height direction between a lower end of the exhaust port and the bonnet cover.

15. The work vehicle according to claim 11, wherein
the muffler cover includes:
 a cover proximal end in contact with the bonnet cover; and
 a cover distal end opposite to the cover proximal end in the exhaust direction;
the extending portion includes a plate base end intersecting with the upright portion and a plate end portion opposite to the plate base end in the extending direction, and a distance between the plate end portion and a center of the first opening in the extending direction is shorter than a distance between the cover distal end and the center of the first opening in the extending direction.

16. The work vehicle according to claim 15, wherein
the baffle plate is formed integrally with the muffler cover.

17. The work vehicle according to claim 2, wherein
the baffle plate is formed integrally with the muffler cover.

18. The work vehicle according to claim 17, wherein
the baffle plate is separated from the bonnet cover in the height direction.

19. The work vehicle according to claim 18, wherein
a distance of a gap between the baffle plate and the bonnet cover in the height direction is smaller than 1/10 of a length of the baffle plate in the height direction.

20. The work vehicle according to claim 1,
wherein the bonnet cover includes:
 a front portion having the first opening; and
 a rear portion having the air intake, and
wherein the rear portion is inclined from the front portion downward in the height direction.

* * * * *